United States Patent [19]

Gaughan et al.

[11] Patent Number: 4,819,993

[45] Date of Patent: Apr. 11, 1989

[54] FREIGHT BRAKE CONTROL VALVE DEVICE HAVING IMPROVED QUICK SERVICE FUNCTION

[75] Inventors: Edward W. Gaughan, Irwin; Theodore B. Hill, North Versailles, both of Pa.

[73] Assignee: American Standard Inc., Wilmerding, Pa.

[21] Appl. No.: 116,942

[22] Filed: Nov. 5, 1987

[51] Int. Cl.$^4$ .................... B60T 15/42; B60T 15/32; B60T 15/46

[52] U.S. Cl. ........................... 303/38; 303/69; 303/72

[58] Field of Search .................. 303/33, 35, 36, 37, 303/38, 41, 44, 69, 72, 75, 77, 78

[56] References Cited

U.S. PATENT DOCUMENTS

| | | | |
|---|---|---|---|
| 1,910,544 | 5/1933 | Hewitt | 303/36 |
| 2,913,282 | 11/1959 | Jeffrey | 303/35 |
| 3,018,138 | 1/1962 | Wilson et al. | 303/36 |
| 3,208,801 | 9/1965 | McClure et al. | 303/36 |
| 4,002,375 | 1/1977 | Weber, Jr. | 303/33 |
| 4,230,374 | 10/1980 | King | 303/22.6 |

OTHER PUBLICATIONS

"AB" Single Capacity Freight Car Air Brake Equipment with the ABD Control Valve; WABCO; 9—1979.
"AB" Single Capacity Freight Car Air Brake Equipment with the ABDW Control Valve; WABCO; 11—1980.

Primary Examiner—Duane A. Reger
Assistant Examiner—Timothy Newholm
Attorney, Agent, or Firm—G. J. Falce

[57] ABSTRACT

A freight brake control valve device having an improved quick service function provided by suppressing premature cut off operation of the quick service limiting valve. In one embodiment of the invention, this is accomplished by connecting the quick service volume pressure to the underside of the quick service limiting valve piston during preliminary quick service to counteract the pressure pulse on the opposite side of the piston that occurs during the transition between the preliminary and secondary stages of quick service. In a second embodiment, pressure is created at the underside of the quick service limiting valve piston by dashpot action of the piston itself.

10 Claims, 2 Drawing Sheets

FREIGHT BRAKE CONTROL VALVE DEVICE HAVING IMPROVED QUICK SERVICE FUNCTION

BACKGROUND OF THE INVENTION

The present invention is related to railway car freight brake control valve devices and particularly to the quick service function provided by these control valve devices for effecting a local venting of the train brake pipe air at each car in order to propagate the brake pipe pressure reduction through the train when a brake application is initiated.

Quick service venting of brake pipe pressure is achieved, as a two-stage operation, in the present standard ABD and ABDW freight brake control valve devices. During the first stage, known as preliminary quick service, initial movement of the service piston slide valve from release position toward service position, in response to a train line reduction of brake pipe pressure, establishes a communication between the car brake pipe and a quick service bulb or volume that is, in turn, vented to atmosphere via a quick service exhaust choke. A local reduction of brake pipe pressure is effected by this communication to supplement the train line reduction of brake pipe pressure at each car, thereby serially transmitting the brake application signal from one car to the next car. In addition, this local reduction of brake pipe pressure encourages continued movement of the service piston to service position without hesitation, wherein the second stage of quick service is realized.

During this secondary stage of quick service, the service piston slide valve cuts off brake pipe pressure from the quick service bulb and connects the brake pipe pressure to the car brake cylinder device via the piston valve stem of the quick service limiting valve until approximately 10-12 psi brake cylinder pressure is developed. With the service piston in service position, it will be appreciated that auxiliary reservoir pressure is also connected to the car brake cylinder device concurrently with the brake pipe pressure during this secondary stage of quick service.

It has been found that, due to the relatively high pressure differential between brake pipe and auxiliary reservoir created by the first stage quick service reduction of brake pipe pressure, the degree of service piston movement into service position is such that maximum flow capacity is established at the service piston graduating valve port connecting auxiliary reservoir pressure to the brake cylinder device. The flow capacity of auxiliary reservoir pressure via this port opening momentarily exceeds the downstream flow capacity to the brake cylinder, thereby creating a short term back pressure surge or pressure pulse in the brake cylinder feedback passage to the quick service limiting valve device. Consequently, the brake cylinder pressure signal at the quick service limiting valve control piston reaches the cut-off valve of 10-12 psi before the actual brake cylinder pressure builds up to this value. Accordingly, the quick service limiting valve is operated to interrupt the connection of brake pipe pressure to the brake cylinder device prematurely, and only following dissipation of the back pressure pulse is the brake pipe connection to the brake cylinder device re-established.

Ideally, a smooth and continuous transition of the local quick service brake pipe pressure reduction should occur from the rapid rate achieved during the first stage preliminary quick service activity to the relatively slow rate achieved during the secondary stage of quick service. Due, at least in part, to this premature operation of the quick service limiting valve, however, a disruption occurs in this local quick service reduction of brake pipe pressure between the preliminary and secondary stages of quick service. This disruption in the brake pipe pressure reduction is indicated by a time lag C, in the graph of FIG. 1, wherein curve A represents the secondary quick service reduction of brake pipe pressure achieved in accordance with the present invention and curve B represents the secondary quick service reduction of brake pipe pressure achieved in the standard ABD and ABDW control valve devices. As can be seen from this graph, during the transition to the secondary stage of quick service, curve B is relatively flat within time period C, indicating that no local reduction of brake pipe pressure occurs during this time.

OBJECTS OF THE INVENTION

It is, therefore, the object of the present invention to provide a freight brake control valve device having an improved quick service function.

A further object of the invention is to decrease the time required to achieve a given reduction of brake pipe pressure during quick service activity.

A still further object of the invention is to prevent premature closure of the quick service limiting valve.

Briefly, the foregoing objectives are achieved in the present invention by providing a counteracting fluid pressure force on the control piston of the quick service limiting valve device to prevent its premature and thus inappropriate actuation to cut-off position due to the momentary pressure surge experienced during transition from preliminary quick service to secondary quick service, as the service piston moves from release to service position.

The foregoing objects and other advantages of the invention will become apparent from the following more detailed explanation when taken in conjunction with the accompanying drawings in which.

DESCRIPTION AND OPERATION

Figure 2:
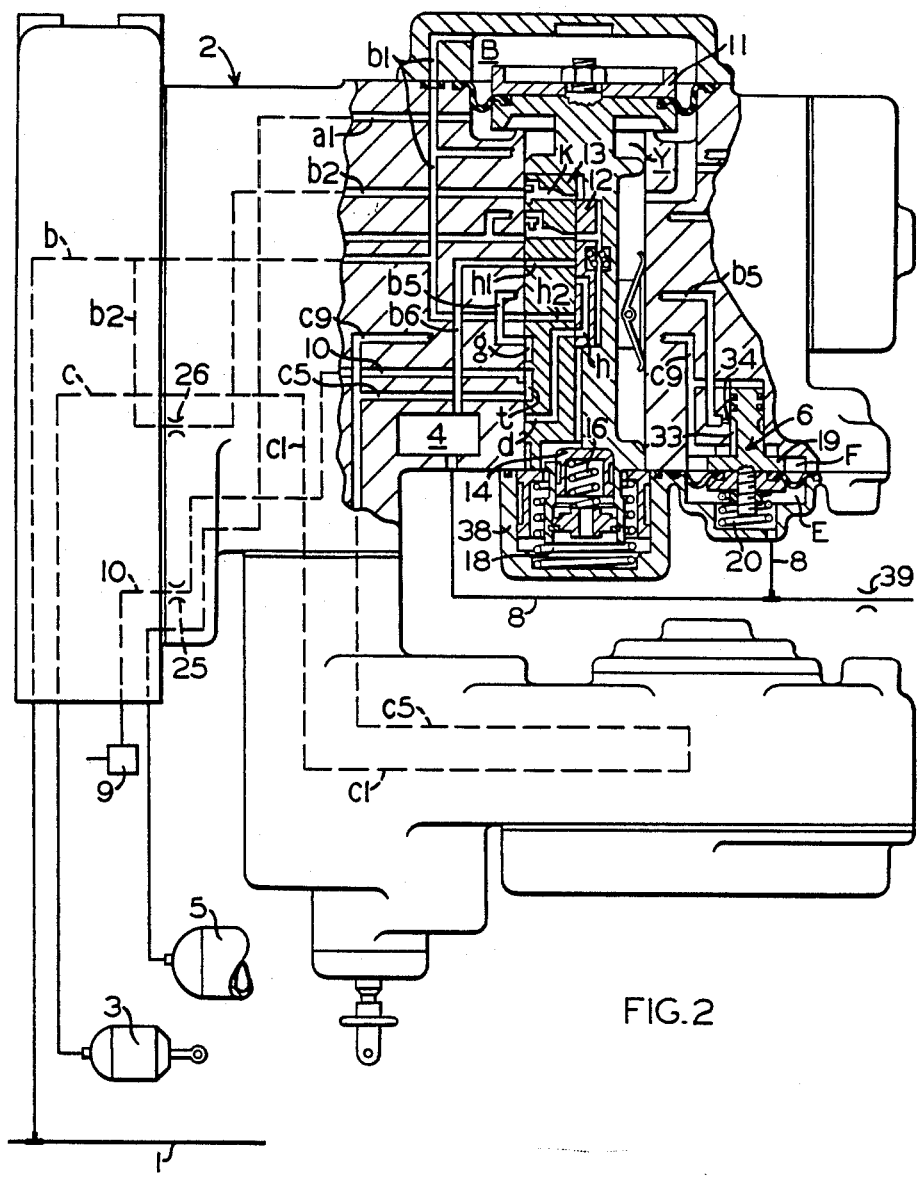
FIG. 2 is a fragmentary diagrammatic view of an ABD/ABDW control valve service portion shown in release position and modified according to one embodiment of the present invention.

In the embodiment of FIG. 2, there is shown a service portion 2 of a freight brake control valve device of the ABD/ABDW type. As is well known to those skilled in the railway braking art, service portion 2 includes a service piston 11 having a slide valve 13 and a graduating valve 12 that cooperate to control the supply, lap, and exhaust of air pressure effective at the brake cylinder device(s) 3 of a railway vehicle freight car, in accordance with pressure variation of the compressed air carried in the car brake pipe 1. Service portion 2 also includes a quick service volume 4 and a quick service limiting valve 6.

In the release position shown, the compressed air carried in brake pipe 1 is connected via passage b1 to chamber B on the face of the service diaphgram piston 11 and to the service slide valve seat. The brake pipe air is also connected via a charging choke 26 and passage b2 to the slide valve seat, from where a choked orifice k in the slide valve communicates with passage b2 to charge a chamber Y on the underside of service piston 11. A passage a1 is connected from chamber Y to the auxiliary reservoir 5, which is thus charged to the pressure carried in brake pipe 1. With brake pipe pressure effective in chamber B and auxiliary reservoir pressure effective in chamber Y charged to the same pressure, a spring 18 establishes release position of service piston 11 in which brake cylinder device(s) 3 is connected to atmosphere via passages C, C1, C5, slide valve port t, exhaust passage 10, exhaust choke 25, and retainer valve 9.

With the brake equipment charged to brake pipe pressure as previously described, a service brake application is made at the brake valve by reducing the brake pipe pressure at a controlled rate.

Brake pipe pressure in chamber B on the face of the service diaphragm piston 11 is thus reduced and the pressure in chamber Y deflects the diaphragm piston 11, moving it and the graduating valve 12 upward. The auxiliary reservoir charging choke 26 creates the foregoing differential by preventing auxiliary reservoir air in chamber Y below the service diaphragm piston from flowing back into brake pipe as fast as the brake pipe is reducing in chamber B above the service diaphragm piston.

The stabilizing spring guide 14 engages the end of the service slide valve 13 and further movement of the diaphragm piston and graduating valve 12 toward service position compresses the stabilizing spring 16. As its name indicates, the stabilizing spring offers a predetermined resistance to diaphragm piston and graduating valve movement so that undesired quick service applications will not be caused by small fluctuations in brake pipe pressure. During this initial diaphragm piston movement, the attached service graduating valve 12 blanks port k in the slide valve, cutting off chamber Y and auxiliary reservoir from brake pipe charging passage b2. It also uncovers port d in the slide valve 13 connecting auxiliary reservoir air to the slide valve seat. After the stabilizing spring is compressed, cavity h in the graduating valve connects ports h1 and h2 through the slide valve, permitting brake pipe air to flow from passage b1 to passage b6 and the quick service volume. This produces a local reduction of brake pipe pressure by allowing brake pipe air to flow into the quick service volume. The reduction is transmitted in rapid wave action serially from car to car; each ABD/ABDW control valve in turn acts in repeater sequence to the adjacent valve to develop prompt starting of brake application on all cars in the train.

The quick service volume 4 is permanently connected to spring chamber E below the quick service limiting valve control piston via pipe 8 and to atmosphere through a quick service exhaust choke 39. In actual practice, an internal passage would be provided, likely in the service portion bottom cover 38, via which the quick service volume pressure would be conducted to the quick service limiting valve chamber E. By this means, a brake pipe pressure buildup develops in chamber E, as well as in the quick service volume. This local reduction of brake pipe pressure continues until sufficient pressure differential develops across the service diaphragm piston to move the service slide valve to service position.

As the service piston moves upwardly to service position, the service slide valve is moved upwardly on its seat, port h2 moving out of registry with port b1 and cutting off flow of brake pipe air from passage b1 to passage b6, thereby terminating the preliminary quick service activity. The quick service volume pressure is subsequently dissipated through exhaust choke 39, during which time the dissipating quick service volume pressure is effective in chamber E of quick service limiting valve 6, for a purpose hereinafter discussed.

In service position, of service piston 11, cavity d in slide valve 13 registers with passage c5 at the slide valve seat, connecting auxiliary reservoir air to brake cylinder device(s) 3 via passages c5, c1 and c. The air in passage c5 is also connected to a feedback passage c9 leading to chamber F of the quick service limiting valve 6. The force of this air acting on the upper side of the quick service limiting valve control piston 19 acts against the force exerted by bias spring 20 to actuate the control piston when approximately 10–12 psi brake cylinder pressure develops. Prior to actuation of control piston 19, brake pipe air in passage b1 is connected via slide valve port g and passage b5 to a groove 33 in the stem of control piston 19, which is registered with chamber F and feedback passage c9 to feed brake pipe pressure to brake cylinder device(s) 3 during secondary quick service. Due to the relatively large pressure differential created between the brake pipe and auxiliary reservoir pressures acting across service piston 11, as a result of the preliminary quick service activity, however, the service piston is positioned to establish full registry of slide valve port d with passage c5, thereby providing a rapid influx of air from auxiliary reservoir 5 to the brake cylinder supply passages, the flow capacity of which is restricted by chokes (not shown) in these passages c1 and c downstream of the slide valve. Consequently, a momentary back pressure surge is developed in feedback passage c9, which is connected to chamber F of the quick service limiting valve 6. This back pressure surge causes a momentary false brake cylinder pressure signal to be effective in chamber F.

Figure 1:
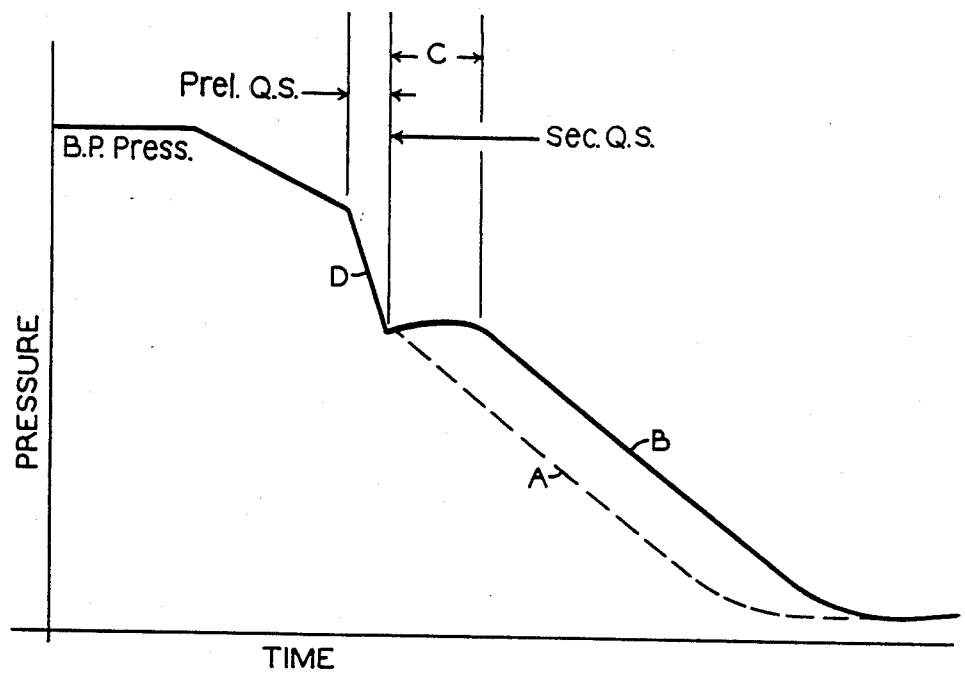
FIG. 1 is a graph showing the quick service brake pipe pressure reduction curve obtained with the present standard ABD and ABDW type freight brake control valve devices and the brake pipe pressure reduction curve achieved in accordance with the present invention.

It will now be appreciated that the dissipating air previously supplied to the quick service limiting valve spring chamber E during preliminary quick service is effective during substantially the same time period as the momentary false brake cylinder pressure signal is effective in chamber F to prevent the quick service limiting valve from being prematurely actuated to its cut-off position, in which secondary quick service reduction of brake pipe pressure would become inadvertently terminated. It will be further appreciated that, in suppressing activation of the quick service limiting valve control piston against this momentary false brake cylinder pressure signal, a smooth and continuous transition of the local quick service reduction of brake pipe pressure from the rapid rate achieved during the preliminary stage of quick service to the slower rate established by a choke 34 at groove 33 in the control piston stem during the secondary quick service stage. In this manner, the quick service reduction of brake pipe pressure at the transition from preliminary to secondary quick service occurs at a point in time that more closely approaches the time frame of the ideal pressure curve A of FIG. 1 than does curve B representing the quick service function achieved in accordance with previously known control valve devices. In reducing the time lag in the secondary quick service reduction of brake pipe pressure, the brake pipe pressure reduction is propagated through the train more quickly than heretofore realized.

Following dissipation of pressure from chamber E and quick service volume 4 via exhaust choke 39, which occurs substantially in synchronism with dissipation of the momentary false back pressure signal or pressure pulse effective in chamber F, spring 20 will become effective as the bias force against which the normally developing brake cylinder pressure in chamber F will be compared during secondary quick service. When this pressure in chamber F and brake cylinder device(s) 3 is sufficient to overcome the bias force exerted by spring 20, control piston 19 will be actuated downwardly to a cut-off position in which groove 34 in the stem of control piston 19 isolates passage b5 from chamber F and passage c9 to terminate the second stage of quick service activity. In this manner, a minimum brake cylinder pressure of approximately 10–12 psi is assured in response to a brake pipe pressure reduction, and the service piston 11 assumes a lap position in the usual, well-known manner. If a further brake pipe reduction is made, no further quick service activity will occur. However, if a further brake application is initiated following release of a previous brake application, the previously described quick service function will be repeated.

Figure 3:
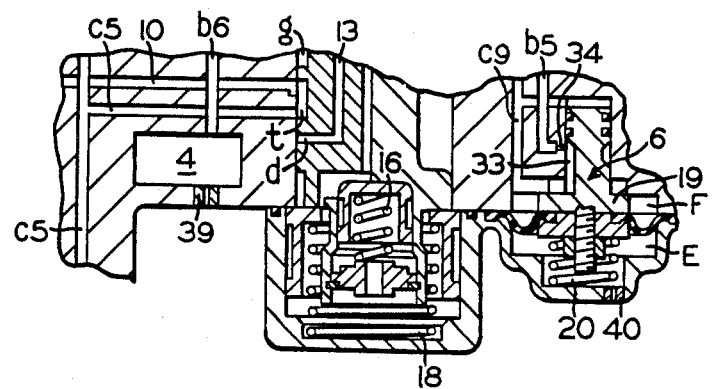
FIG. 3 is a fragmentary diagrammatic view of an ABD/ABDW type control valve service portion shown in release position and modified according to another embodiment of the present invention.

The embodiment of the invention shown in FIG. 3 differs from that of FIG. 2 by eliminating the connection of the quick service volume pressure to chamber E of the quick service limiting valve 6 and venting chamber E to atmosphere via a small dashpot choke 40. Choke 39, in this embodiment, vents the quick service volume directly to atmosphere, as in the conventional ABD/ABDW control valves. Choke 40 is selected in accordance with the volume of chamber E and the distance control piston 19 moves prior to cutoff, so as to create a pressure in chamber E by dashpot action sufficient to counteract the previously mentioned momentary false brake cylinder pressure signal produced by the aforementioned back pressure pulse effective in chamber F at the transition point between preliminary and second-stage quick service. This dashpot action occurs by reason of choke 40 restricting air flow from chamber E during rapid downward displacement of piston 19, thus creating a momentary pressure increase in chamber E. In this embodiment, the counteracting pressure in chamber E automatically increases in direct relationship to the speed of displacement of piston 19, which is, in turn, dependent upon the amplitude of the momentary false brake cylinder pressure signal or back pressure pulse effective in chamber F. In this manner, actuation of the quick service limiting valve control piston 19 in response to a sudden pressure rise in chamber E is suppressed. As the back pressure pulse and counteracting dashpot pressures subsequently dissipate, spring 20 becomes effective to set the point (typically 10–12 psi) at which the normal brake cylinder build-up pressure will actuate the quick service limiting valve and accordingly terminate the second-stage of quick service.

In both embodiments of the invention shown in FIGS. 2 and 3, premature and inappropriate actuation of the quick service limiting valve is prevented from occurring to achieve a more efficient quick service function, in which the local reduction of brake pipe pressure is realized more quickly than heretofore possible, whereby a faster propagation of the trainline brake pipe pressure and, thus, faster application of the train brakes results.

We claim:

1. For controlling the brakes on a railway car having a brake pipe normally charged with fluid at a certain chosen pressure, an auxiliary reservoir charged with fluid under pressure from said brake pipe, and a fluid pressure actuated brake cylinder device, there is provided a brake control valve device comprising:
 (a) a service piston abutment subject opposingly to said brake pipe fluid under pressure and said auxiliary reservoir fluid under pressure; (b) a supply passage connected to said brake cylinder device; (c) a quick service volume; (d) first valve means carried by said service piston abutment for establishing a preliminary quick service connection of fluid pressure from said brake pipe to said quick service volume during initial movement of said service piston from a release position to a service position in response to a reduction of said brake pipe fluid under pressure relative to said auxiliary reservoir fluid under pressure, and during subsequent movement, cutting off said preliminary quick service connection, while concurrently establishing a service connection of said auxiliary reservoir fluid under pressure to said supply passage and a secondary quick service connection of said brake pipe fluid under pressure to said supply passage; (e) quick service limiting valve means comprising:
  (i) a control piston forming first and second pressure chambers on opposite sides thereof;
  (ii) bias means acting on said control piston for urging said control piston toward a first position, said first pressure chamber being subject to fluid under pressure supplied to said brake cylinder device via said secondary quick service connection to effect actuation of said control piston to a second position when said brake cylinder pressure exceeds a predetermined value; and
  (iii) second valve means operable in said first position of said control piston for conducting flow of fluid under pressure from said brake pipe to said supply passage and operable in said second position of said control piston for interrupting flow of fluid under pressure from said brake pipe to said supply passage; and
 (f) suppression means comprising means for effecting fluid pressurization of said second pressure chamber to thereby suppress said actuation of said control piston to said second position when said first valve means establishes said second quick service connection, whereby premature operation of said quick service limiting valve means is prevented from occurring prior to said brake cylinder pressure exceeding said predetermined value.

2. A brake control valve device as recited in claim 1, wherein said suppression means comprises means for connecting fluid under pressure from said quick service volume to said second pressure chamber.

3. A brake control valve device as recited in claim 2 further characterized in that said first pressure chamber is subject to a momentary pressure increase in excess of said predetermined value when said first valve means concurrently establishes said service connection and said secondary quick service connection.

4. A brake control valve device as recited in claim 3, further characterized in that the fluid under pressure effective in said second pressure chamber coacts with said bias means to counteract said momentary pressure increase in said first pressure chamber in excess of said predetermined value to thereby suppress said operation of said control piston to said second position.

5. A brake control valve device as recited in claim 2, wherein said suppression means further comprises choke means for venting said second pressure chamber.

6. A brake control valve device as recited in claim 5, wherein said choke means further vents said quick service volume.

7. A brake control valve device as recited in claim 1, wherein said suppression means comprises:
   (a) said second pressure chamber being an atmospheric pressure chamber; and
   (b) a choke via which said second pressure chamber is connected to atmosphere.

8. A brake control valve device as recited in claim 7, further characterized in that said first pressure chamber is subject to a momentary pressure increase in excess of said predetermined value when said first valve means concurrently establishes said service connection and said secondary quick service connection.

9. A brake control valve device as recited in claim 8, wherein said choke is sized to restrict said venting of said second chamber to atmosphere such as to cause a momentary pressure increase in said second pressure chamber upon movement of said control piston, in response to said momentary pressure increase in said first pressure chamber.

10. A brake control valve device as recited in claim 8, wherein said momentary pressure increase in said second pressure chamber coacts with said bias means to suppress said actuation of said control piston to said second position in response to said momentary increase of fluid under pressure in said first pressure chamber in excess of said predetermined value.

* * * * *